(12) United States Patent
Yan et al.

(10) Patent No.: US 10,232,902 B2
(45) Date of Patent: Mar. 19, 2019

(54) LEISURE SPORTS SCOOTER

(71) Applicant: Kexue Yan, Dongyang (CN)

(72) Inventors: Kexue Yan, Dongyang (CN); Hongda Yan, Dongyang (CN)

(73) Assignee: Kexue Yan, Dongyang (CN)

( * ) Notice: Subject to any disclaimer, the term of this patent is extended or adjusted under 35 U.S.C. 154(b) by 63 days.

(21) Appl. No.: 15/319,367

(22) PCT Filed: Jun. 17, 2015

(86) PCT No.: PCT/CN2015/081657
§ 371 (c)(1),
(2) Date: Dec. 15, 2016

(87) PCT Pub. No.: WO2015/192773
PCT Pub. Date: Dec. 23, 2015

(65) Prior Publication Data
US 2018/0162476 A1   Jun. 14, 2018

(30) Foreign Application Priority Data

Jun. 20, 2014  (CN) .................... 2014 2 0329557 U
Jun. 20, 2014  (CN) .................... 2014 2 0329627 U
Sep. 12, 2014  (CN) ........................ 2014 1 0462464

(51) Int. Cl.
*B62K 15/00* (2006.01)
*B62K 3/00* (2006.01)
*B62K 21/18* (2006.01)

(52) U.S. Cl.
CPC .............. *B62K 3/002* (2013.01); *B62K 15/00* (2013.01); *B62K 15/006* (2013.01); *B62K 21/18* (2013.01); *B62K 2700/56* (2013.01)

(58) Field of Classification Search
CPC ...... B62K 3/002; B62K 15/006; B62K 21/18; B62K 2700/56
See application file for complete search history.

(56) References Cited

U.S. PATENT DOCUMENTS 6,217,058 B1    4/2001  Wang et al.
6,517,093 B2 *  2/2003  Feng ..................... B62K 3/002
                                              280/87.042
(Continued)

FOREIGN PATENT DOCUMENTS

CN     2441519 Y     8/2001
CN     2730735 Y    10/2005
(Continued)

OTHER PUBLICATIONS

VALCO/Valley Tool & Die, Inc. Catalog, last revised Jan. 2014.*
(Continued)

*Primary Examiner* — James A Shriver, II
*Assistant Examiner* — Steve Clemmons
(74) *Attorney, Agent, or Firm* — Ladas & Parry LLP

(57) ABSTRACT

A leisure sports scooter comprises a scooter body, wheels and a handlebar. A folding mechanism is arranged between the handlebar and the scooter body. According to the folding mechanism, a hinge-connection section is arranged at the lower end of the handlebar and connected to a connection base through a rotary shaft. The hinge-connection section is a handlebar joint fixed to the lower end of the handlebar or is a lower handlebar section integrated with the handlebar. The rotary shaft is positioned on the connection base. The handlebar can move vertically relative to the rotary shaft. A matched positioning mechanism is arranged between the handlebar and the connection base. When the handlebar moves to a first position, the handlebar and the connection base are positioned, and the positioning mechanism stops the handlebar from rotating. When the handlebar moves to a second position, the handlebar is rotated around the rotary shaft to be folded or unfolded. The folding mechanism is provided with a safety mechanism used for stopping the handlebar from moving when the handlebar is positioned.

(Continued)

The handlebar can be folded or unfolded by being pulled upwards and rotated, so the leisure sports scooter is quite convenient to use.

8 Claims, 9 Drawing Sheets

(56) References Cited

U.S. PATENT DOCUMENTS

| | | | | |
|---|---|---|---|---|
| 6,991,243 B2* | 1/2006 | Boyle | ................... | B62K 3/002 280/47.371 |
| 9,027,944 B2* | 5/2015 | Johnson | ............... | B62K 15/006 280/87.041 |
| 9,862,449 B2* | 1/2018 | Xu | ......................... | B62K 19/18 |
| 2001/0017450 A1 | 8/2001 | Chuang | | |
| 2002/0020980 A1* | 2/2002 | Lee | ........................ | B62K 3/002 280/87.041 |
| 2002/0145264 A1* | 10/2002 | Hung | ..................... | B62K 3/002 280/87.041 |
| 2002/0167143 A1* | 11/2002 | Shaw | ..................... | A63C 17/01 280/87.041 |
| 2002/0180169 A1 | 12/2002 | Kwok | | |
| 2003/0067132 A1* | 4/2003 | Lin | ........................ | B62K 3/002 280/87.041 |
| 2012/0193883 A1 | 8/2012 | Tsai | | |

FOREIGN PATENT DOCUMENTS

| | | | | |
|---|---|---|---|---|
| CN | 201258060 Y | | 6/2009 | |
| CN | 201457624 U | | 5/2010 | |
| CN | 201808635 U | * | 4/2011 | |
| CN | 201808635 U | | 4/2011 | |
| CN | 102795288 A | | 11/2012 | |
| CN | 202593743 U | | 12/2012 | |
| CN | 104176183 A | | 12/2014 | |
| CN | 203888978 U | | 12/2014 | |
| CN | 203892426 U | | 12/2014 | |
| DE | 20010162 U1 | | 8/2000 | |
| DE | 20011562 U1 | | 10/2000 | |
| DE | 10215102 A1 | * | 10/2003 | ............. B62K 3/002 |
| EP | 1213216 A3 | * | 8/2003 | ............. B62K 3/002 |
| WO | 0234614 A1 | | 5/2002 | |

OTHER PUBLICATIONS

Valco Valley Tool & Die, Inc. Catalog, "E" Style Snap Buttons, pp. 13-14 (Year: 2014).*
International Search Report for PCT/CN2015/081657 dated Aug. 20, 2015 and its English translation provided by WIPO.
Written Opinion for PCT/CN2015/081657 dated Aug. 20, 2015 and its English translation provided by WIPO.
First Search of the State Intellectual Property Office of the P.R.C. For application No. 201410462464.4.
First Office Action and English translation of the State Intellectual Property Office of the P.R.C. for application No. 201410462464.4.
Second Office Action and English translation of the State Intellectual Property Office of the P.R.C. for application No. 201410462464. 4.
From PRC Application No. 201410462464.4, Notice of Allowance dated Apr. 4, 2018 with English translation from Google translate.
International Preliminary Report on Patentability (IPRP; Ch 1) for PCT/CN2015/081657 dated Dec. 29, 2016 and its English translation provided by WIPO.
Third Office Action and English translation from Global Dossier of the State Intellectual Property Office of the P.R.C. for application No. 201410462464.4 dated Dec. 14, 2016.
Fourth Office Action and English translation from Global Dossier of the State Intellectual Property Office of the P.R.C. for application No. 201410462464.4 dated Dec. 7, 2017.
From EPO Application No. 15809163.7, European Search Report and Search Opinion dated Mar. 19, 2018.

* cited by examiner

LEISURE SPORTS SCOOTER

CROSS-REFERENCE TO RELATED APPLICATIONS

The present application is the U.S. national phase of PCT application PCT/CN2015/081657 filed on Jun. 17, 2015, which claims priority to Chinese Application No. 201420329557.5 filed on Jun. 20, 2014; Chinese Application No. 201420329627.7 filed on Jun. 20, 2014; and Chinese Application No. 201410462464.4 filed on Sep. 12, 2014, the disclosures of which are incorporated herein by reference in their entireties.

TECHNICAL FIELD OF THE INVENTION

The present invention relates to a leisure sports scooter.

BACKGROUND OF THE INVENTION

In order to be easy to carry, existing scooters, frog kick scooters, tri scooters and swing scooters are additionally provided with a handlebar folding unit. Chinese Patent 201020523385.7 discloses a "Folding Unit for Scooters". In this technical solution, a folding unit for scooters is characterized in that a connecting base formed by two mutually matched casings is provided at a lower end of a handlebar; a positioning tab is provided within the cavity of the connecting base; a concave pit is provided on one side of the positioning tab; the connecting base in front of the concave pit is provided with an elongated through hole; a lower portion of the connecting base is in pin connection and rotatable fit with a fixed seat; a lower end of the positioning tab is protruded out of the bottom of the connecting base to be in elastic socket-fit with the fixed seat; and a positioning button and a spring are provided within the cavity of the connecting base, the fixed seat is provided with a positioning hole matched with the positioning button, and the positioning button and the positioning hole are in elastic socket-fit with each other. The folding unit for scooters features in simple and compact structure. However, it has the following deficiencies. First, since the positioning tab is provided within the cavity of the connecting base, when in use, one must put a finger into the cavity to pull the positioning tab and then rotate the handlebar to complete folding or unfolding of the positioning unit, which is very inconvenient. Second, the scooter has no safety mechanism, and its safety performance is thus unsatisfactory when in use. Third, a connecting base formed by two mutually matched casings is required to be customized for the scooter, resulting in complex structure and high manufacturing cost.

SUMMARY OF THE INVENTION

An objective of the present invention is to provide a leisure sports scooter featuring in convenient folding, good safety performance and simple structure.

A leisure sports scooter is provided, comprising a scooter body, wheels and a handlebar, a folding mechanism being provided between the handlebar and the scooter body, the folding mechanism comprising a hinging segment provided at a lower end of the handlebar and connected with a connecting base through a rotating shaft, characterized in that the hinging segment is a handlebar joint fixed at a lower handlebar segment of the handlebar or the hinging segment is a lower handlebar segment of the handlebar integrated with the handlebar; the rotating shaft is positioned on the connecting base, the handlebar can move up and down relatively to the rotating shaft, and a matched positioning mechanism is provided between the handlebar and the connecting base; when the handlebar moves to a first position, the handlebar and the connecting base are positioned, and the positioning mechanism prevents the handlebar from rotating; when the handlebar moves to a second position, the positioning mechanism is disabled, and when the handlebar is rotated, the handlebar can rotate around the rotating shaft to be folded or unfolded; and the folding mechanism is equipped with a safety mechanism preventing the handlebar from moving upon positioning of the handlebar.

The hinging segment and the handlebar can be integrated, and also can be separated and fixed through a screw. If they are separated, one end of the hinging segment is open while the other end is closed, the handlebar is inserted into the hinging segment from the open end of the hinging segment and then the two are fixed through a screw, and the closed segment of the hinging segment is located in the connecting base.

The folding mechanism of the present invention works in the following way: when in use, the safety mechanism is started; and the handlebar is pulled; the positioning mechanism is disabled when the handlebar moves to a second position, and at this moment, the handlebar is rotated so that the handlebar rotates around the rotating shaft so as to complete folding or unfolding operation.

The present invention has the following advantages: the handlebar of the present invention can move up and down relatively to the rotating shaft, and a matched positioning mechanism is provided between the handlebar and the connecting base; the positioning mechanism is disabled by releasing the safety mechanism and pulling the handlebar; and the operations of folding and unfolding can be completed by pulling and rotating the handlebar, which is very convenient. Since the safety mechanism for preventing the handlebar from moving when the handlebar is positioned, it is safer and more reliable to use the folding mechanism of the present invention. Since no connecting base formed by two mutually matched casings is required to be customized for the scooter of the present invention, the present invention has a simpler structure and reduced manufacturing cost. The leisure sports scooter of the present invention encompasses unpowered leisure sports scooters such as scooters, frog kick scooters, tri scooters, swing scooters and strollers, and powered leisure sports scooters such as electric scooters.

In the present invention, the positioning mechanism comprises: a boss arranged on the bottom of the hinging segment and a recess provided in the connecting base and matched with the boss. Of course, the positioning mechanism can adopt the following arrangement: the positioning mechanism comprises a recess arranged on the bottom of the hinging segment and a boss provided in the connecting base and matched with the recess. The purpose of the present invention can be realized as long as the positioning mechanism can realize positioning of the hinging segment and the connecting base when the handlebar is upright and prevent the handlebar from rotating. The above two positioning mechanisms can realize the purpose of the present invention. Of course, the positioning mechanism also can use various structures of other forms. "Upright" in the present invention means erecting the handlebar for convenience of use, and the upright angle is not limited herein.

In the present invention, the hinging segment is formed with an elongated through hole; a rotating shaft hole is formed in the connecting base, the rotating shaft is passed through the rotating shaft and the elongated through hole to hinge the hinging segment to the connecting base; and by pulling upward the handlebar, the elongated through hole may enable the handlebar to move up and down relatively to the rotating shaft. This structure can conveniently realize the purpose of enabling the handlebar to move up and down relatively to the rotating shaft. The elongated through hole may be one of a rectangle hole, a kidney-shaped hole and an irregularly-shaped hole. The arrangement of the elongated through hole can enable the hinging segment to move up and down relatively to the connecting base. In other words, the rotating shaft penetrates through the round through hole of the connecting base, and the positions of the rotating shaft and the connecting base are relatively fixed. Since the handlebar is provided with an elongated through hole, by pulling upward the handlebar, the handlebar can move up and down around the rotating shaft. That is, the relative positions of the handlebar and the connecting base are changed, equivalent to that the handlebar moves up and down relatively to the connecting base.

In the present invention, the safety mechanism comprises a safety catch, the safety catch being provided with a button, a safety spring and a positioning bump; the connecting base and the hinging segment are positioned by the positioning bump to prevent the handlebar from moving relatively to the connecting base. When the connecting base and the hinging segment are positioned by the positioning bump, the handlebar can be prevented from moving relatively to the connecting base, and the leisure sports scooter is prevented from unexpected folding of the handlebar when in use, thereby improving the safety performance of the leisure sports scooter. When it needs to be folded, the button is pressed down to force the positioning bump leave the positioning site. At this moment, the folding or unfolding operation can be conducted.

In the present invention, an upright positioning hole and a folding positioning hole are formed on the connecting base, and the positioning bump can get into or out of the upright positioning hole and a folding positioning hole. Matching of an upright positioning hole and a positioning bump can realize positioning when the scooter is upright, and present the leisure sports scooter from unexpected folding of the handlebar when in use. Matching of a folding positioning hole and a positioning bump can realize lifting of the whole leisure sports scooter by lifting the handlebar by a hand upon folding.

In the present invention, the button and the positioning bump are integrated, and the safety catch has an abutment end resisted against the inner wall of the hinging segment; the button is provided between the positioning bump and the abutment end; and a button mounting hole is provided in the hinging segment, the button is exposed outside the button mounting hole, and the position of the button is higher than the upper end of the connecting base. When the button of the safety catch of such a structure is pressed down, the amount of displacement of the positioning bump is larger than that of the button, and this conveniently realizes the disengagement of the positioning bump from the positioning hole.

In the present invention, the button and the positioning bump are integrated, the safety catch is arranged on the outer side of a handlebar joint, a rotating fulcrum is provided in the middle segment of the safety catch, and the button and the positioning bump are respectively arranged on two sides of the rotating fulcrum. The safety catch of such a structure can also realize the purpose of the present invention.

In the present invention, the safety catch has two groups of buttons and positioning bumps, and the buttons and the positioning bumps are integrated; a button mounting hole is provided in the hinging segment, the button is exposed outside the button mounting hole; and the position of the button is higher than upper end of the connecting base. This structure can also realize the purpose of the present invention.

In the present invention, the leisure sports scooter further comprises a reset mechanism which comprises a reset spring, and the reset spring is located between the rotating shaft and the hinging segment. Since the reset spring can force the handlebar to move to the first position, when the folding mechanism unfolds from the folded position to the unfolded position, the reset spring can force the handlebar to bounce outward and automatically position the hinging segment and the connecting base, which is more convenient for using. Due to the reset spring, the leisure sports scooter can be folded only by lifting the handlebar upward while pressing down the safety button, which makes it safer for using.

In the present invention, three reset mechanisms are listed, one of which is that the reset spring is a pressure spring; one end of the hinging segment is open while the other end thereof is closed, and the open end of the hinging segment is connected with a handlebar; a spring seat is provided between the handlebar and the hinging segment, and the spring seat is sleeved on the rotating shaft; one end of the reset spring is resisted against an inner wall of the closed end of the hinging segment, and the other end of the reset spring is against the spring seat.

The second structure is that the reset spring is a pressure spring; an open slot capable of receiving the rotating shaft is formed beneath the handlebar; one end of the hinging segment is open while the other end of the hinging segment is closed, and the open end of the hinging segment is connected with the handlebar, one end of the reset spring is resisted against an inner cavity of the hinging segment, and the other end of the reset spring is resisted against the lower end of the handlebar. An open slot on the handlebar is provided for reducing the manufacturing accuracy of the handlebar and also for reducing the accuracy requirement on the spring. It is needed to guarantee that, when the spring resets from the compressed state, the rotating shaft is within the open slot and will not hinder the positioning between the handlebar and the connecting base due to the open slot.

The third structure is that the reset spring is a tension spring; a pin shaft is provided at the inner wall of the handlebar; and one end of the reset spring is connected with the rotating shaft, and the other end of the reset spring is connected with the pin shaft.

In the present invention, a folding platform is provided in the connecting base, and the folding platform is matched with the boss or recess on the hinging segment to prevent the handlebar from rotating at the folded position. Matching the folding platform with the boss or recess on the hinging segment is good for lifting the whole leisure sports scooter when lifting the handlebar by a hand.

In the present invention, the handlebar is arranged at a front end of the scooter body, a brake is provided at a rear end of the scooter body, and the brake is located above a rear wheel and wrapped with a brake sleeve. The brake sleeve may be a rubber brake sleeve, a PVC brake sleeve, a TPR brake sleeve or a poly (ester-amine) brake sleeve. The brake sleeve is in direct flexible contact with the wheel to increase the friction upon braking and can better prevent the leisure sports scooter from traveling forward so as to realize the purpose of quick braking, and the contact between the brake sleeve and the wheel reduces the wear rate of the wheel, avoids jamming, and improves personal safety of the user.

Therefore, the leisure sports scooter of the present invention has the following advantages: simple structure, convenient operation, good safety performance, and long service life.

DETAILED DESCRIPTION OF THE INVENTION

The technical solution of the present invention will be further described in detail with reference to the accompanying drawings by embodiments.

Embodiments

Figure 1:
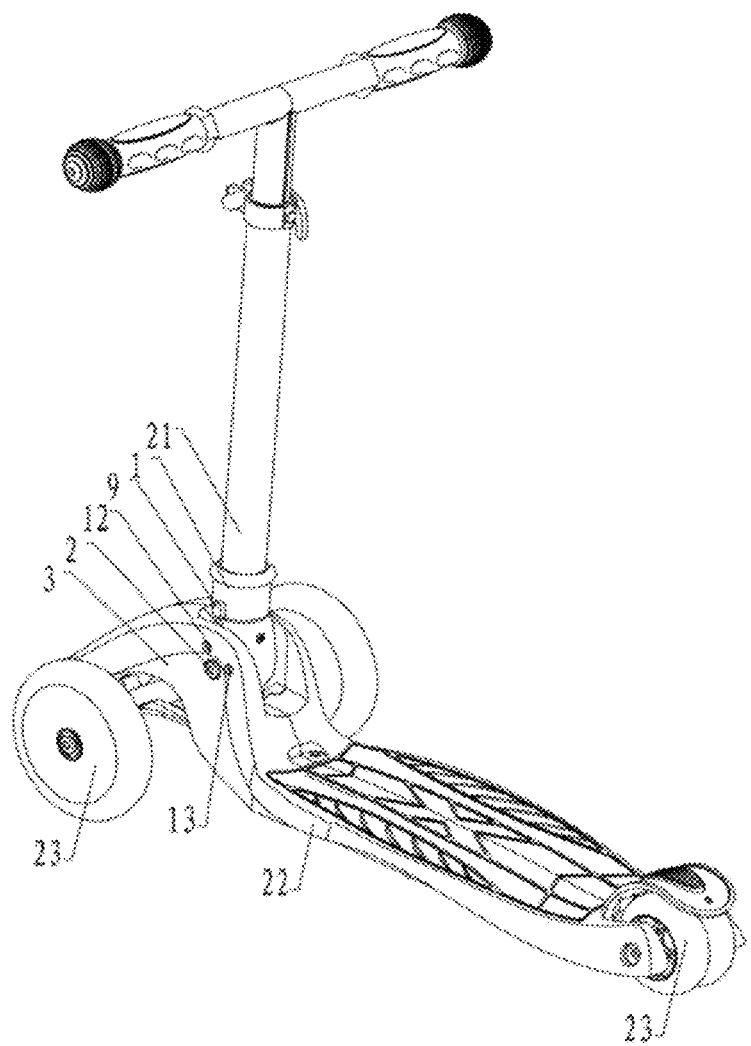
FIG. 1 is a schematic diagram of a handlebar of a leisure sports scooter according to Embodiment 1 of the present invention, when unfolded.
Figure 2:
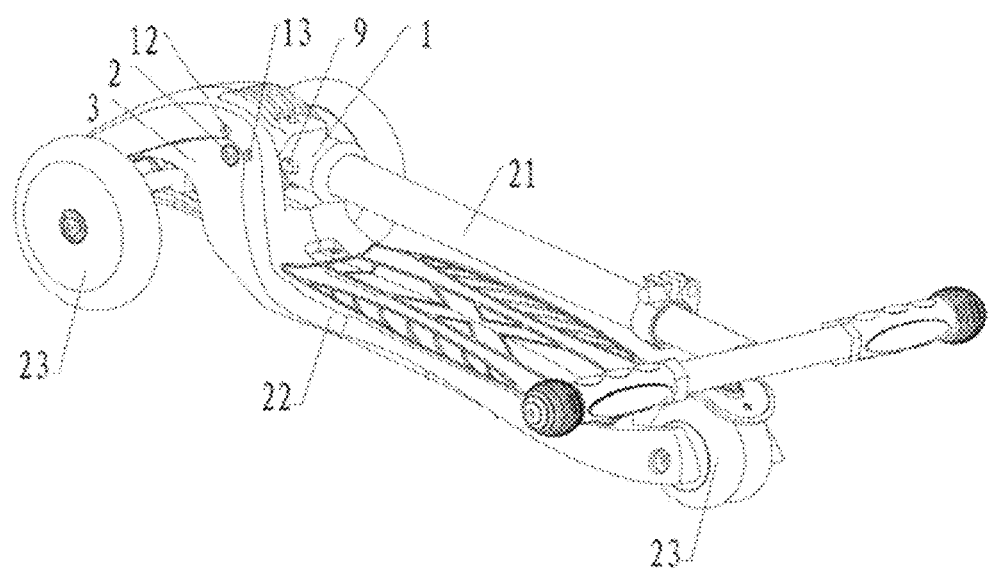
FIG. 2 is a schematic diagram of a handlebar of a leisure sports scooter according to Embodiment 1 of the present invention, when folded.
Figure 3:
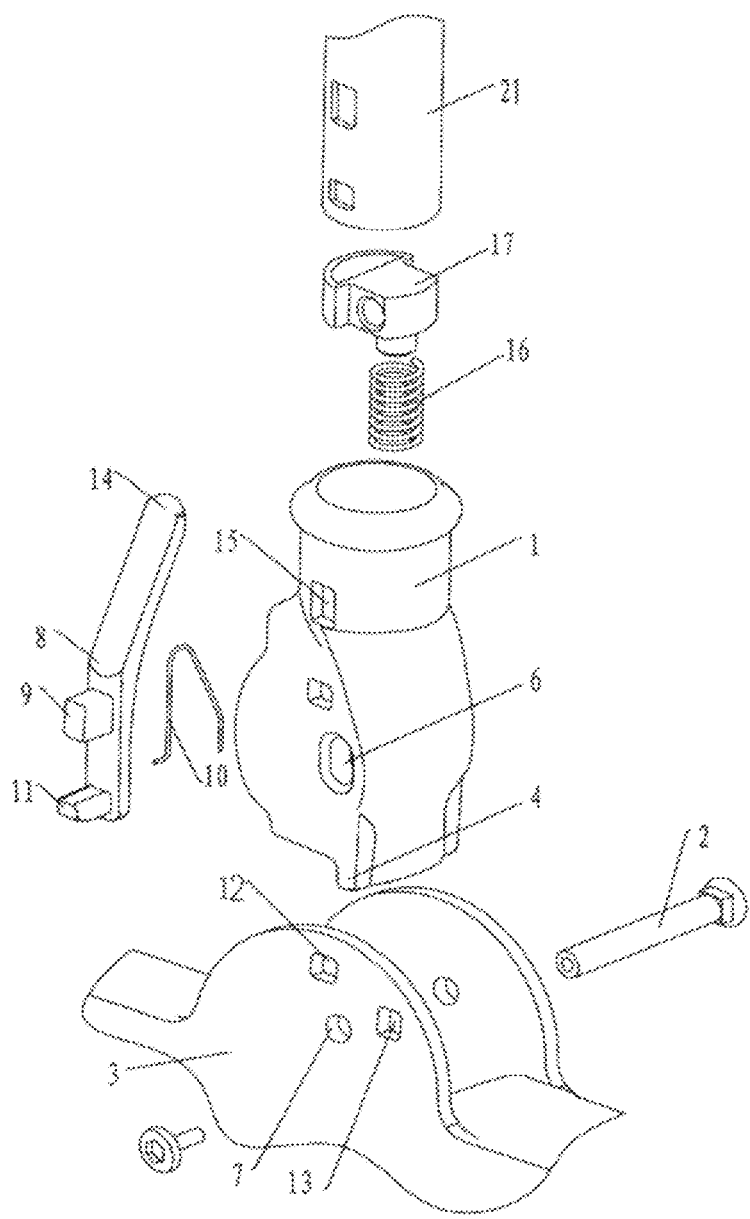
FIG. 3 is an exploded view of components of a handlebar folding mechanism according to Embodiment 1 of the present invention.
Figure 4:
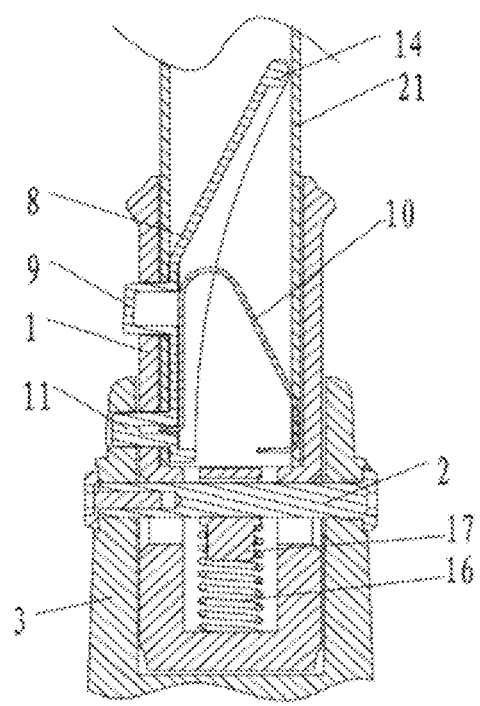
FIG. 4 is a cross-sectional view of a handlebar folding mechanism taken along the safety catch, according to Embodiment 1 of the present invention.
Figure 5:
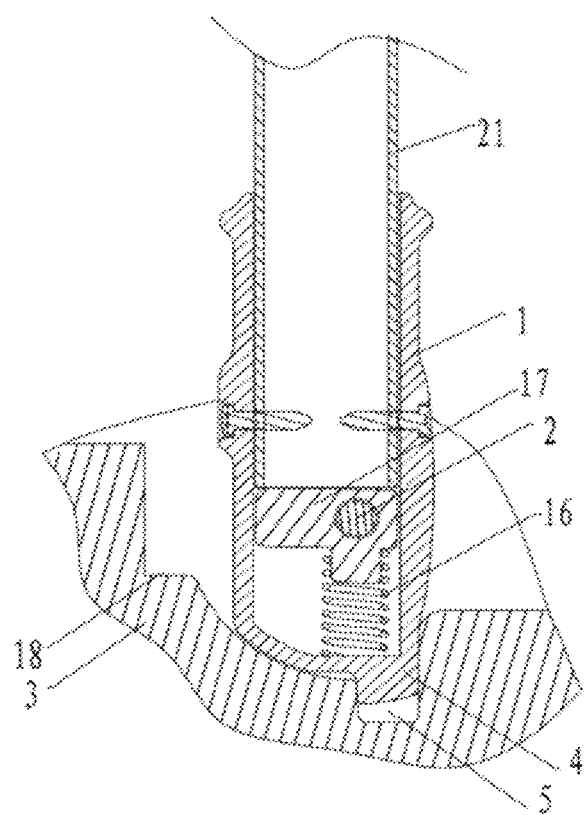
FIG. 5 is a structural cross-sectional view of a connecting base when a handlebar of the handlebar folding mechanism is upright, according to Embodiment 1 of the present invention.
Figure 6:
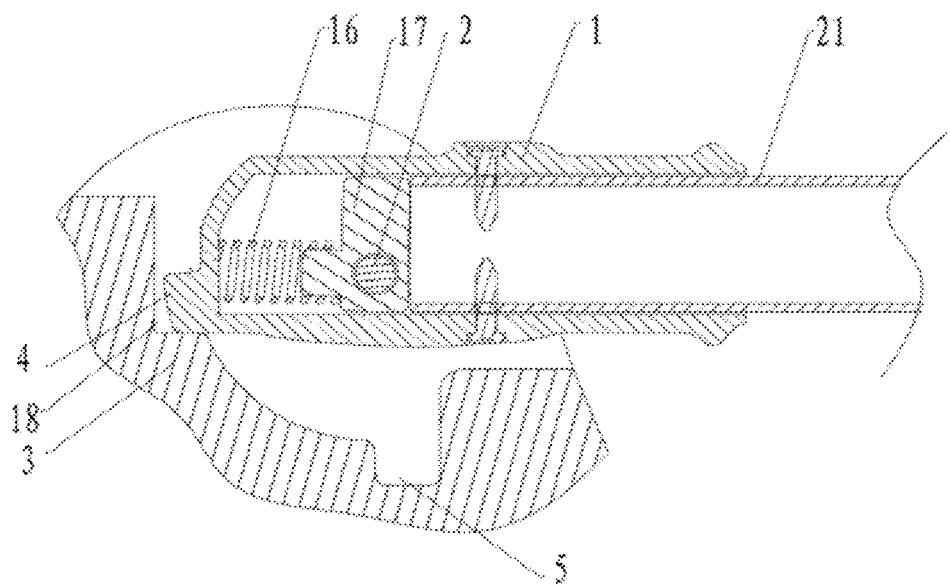
FIG. 6 is a structural cross-sectional view of a connecting base when a handlebar of the handlebar folding mechanism is folded, according to Embodiment 1 of the present invention.

FIGS. 1-6 show the Embodiment 1 of the present invention. With reference to FIGS. 1-6, the leisure sports scooter of this embodiment comprises a scooter body 22, wheels 23 and a handlebar 21, a folding mechanism being provided between the handlebar 21 and the scooter body 22, the folding mechanism comprising a hinging segment 1 at a lower handlebar segment of the handlebar 21, the handlebar 21 and the hinging segment 1 being connected by a screw (as shown in FIG. 5). In this embodiment, the hinging segment is a handlebar joint fixed at a lower end of the handlebar 21. In this embodiment, a rotating shaft hole 7 is formed in the connecting base 3, an elongated through hole 7 is formed on the hinging segment at a corresponding position, and the rotating shaft 2 is passed through the rotating shaft hole 7 and the elongated through hole 7 to connect the hinging segment 1 to the connecting base 3. The arrangement of the elongated through hole 7 enables the handlebar 21 to move up and down relatively to the connecting base 3, and a matched positioning mechanism is provided between the handlebar and the connecting base. The positioning mechanism comprises a boss 4 arranged on the bottom of the hinging segment and a recess 5 provided in the connecting base and matched with the boss. Of course, the positioning mechanism can adopt the following arrangement: the positioning mechanism comprises a recess arranged on the bottom of the hinging segment and a boss provided in the connecting base and matched with the recess. The purpose of the present invention can be realized as long as the positioning mechanism can realize positioning of the hinging segment and the connecting base when the handlebar is upright and prevent the handlebar from rotating.

By pulling upward the handlebar, the handlebar moves to a second position along the elongated through hole, the positioning mechanism is disabled, and the boss 4 on the bottom of the hinging segment is disengaged from the recess 5 of the connecting base; By rotating the handlebar, the handlebar can rotate around the rotating shaft to be folded or unfolded; by releasing the handlebar, the handlebar moves downward to a first position along the elongated through hole due to the reset mechanism in the folding mechanism, the handlebar and the connecting base are positioned, the boss 4 on the bottom of the hinging segment is clamped into the recess 5 of the connecting base, and the positioning mechanism prevents the handlebar from rotating. In this embodiment, the reset mechanism comprises a reset spring 16 provided between the rotating shaft 2 and the hinging segment 1, and when in positioning, the reset spring forces the handlebar to move to the first position. Since the reset spring can force the handlebar to move to the first position, when the folding mechanism unfolds from the folded position to the unfolded position, the reset spring can force the handlebar to bounce outward and automatically position the hinging segment and the connecting base. Due to the reset spring, the leisure sports scooter can be folded only by lifting the handlebar upward while pressing down the safety button.

In this embodiment, the safety mechanism comprises a safety catch 8, the safety catch being provided with a button 9, a safety spring 10 and a positioning bump 11; the connecting base 3 and the hinging segment 1 are positioned by the positioning bump to prevent the handlebar from moving relatively to the connecting base. When the connecting base and the hinging segment are positioned by the positioning bump, the handlebar can be prevented from moving relatively to the connecting base, and the leisure sports scooter is prevented from unexpected folding of the handlebar when in use. When it needs to be folded, the button is pressed down to force the positioning bump leave the positioning site. At this moment, the folding or unfolding operation can be conducted.

In this embodiment, a folding platform 18 is provided in the connecting base, and the folding platform is matched with the boss 4 on the hinging segment to prevent the handlebar from rotating at the folded position. Matching the folding platform with the boss or recess on the hinging segment is good for lifting the whole leisure sports scooter when lifting the handlebar by a hand.

In this embodiment, an upright positioning hole 12 and a folding positioning hole 13 are formed on the connecting base, and the positioning bump can get into or out of the upright positioning hole 12 and a folding positioning hole 13. Matching of an upright positioning hole and a positioning bump can realize positioning when the scooter is upright, and present the leisure sports scooter from unexpected folding of the handlebar when in use. Matching of a folding positioning hole and a positioning bump can prevent the folding platform from disengaging from the boss on the hinging segment. When the whole leisure sports scooter is lifted by lifting the handlebar by a hand, the handlebar will not be unfolded unexpectedly.

In this embodiment, the button 9 and the positioning bump 11 are integrated, the safety catch has an abutment end 14 resisted against the inner wall of the hinging segment; the button is provided between the positioning bump and the abutment end; and a button mounting hole 15 is provided in the hinging segment, the button is exposed outside the button mounting hole, and the position of the button is higher than the upper end of the connecting base. When the button of the safety catch of such a structure is pressed down, the amount of displacement of the positioning bump is larger than that of the button, and this conveniently realizes the disengagement of the positioning bump from the positioning hole.

In this embodiment, one end of the reset spring is resisted against an inner cavity of the hinging segment, while the other end is resisted against a spring seat 17, and the spring seat is resisted against the rotating shaft 2.

When the leisure sports scooter of this embodiment is in use, the safety mechanism is started by pressing down the safety button; and the handlebar is pulled; the positioning mechanism is disabled when the handlebar moves to the second position, and at this moment, the handlebar is rotated so that the handlebar rotates around the rotating shaft so as to complete folding or unfolding operation.

Figure 13:
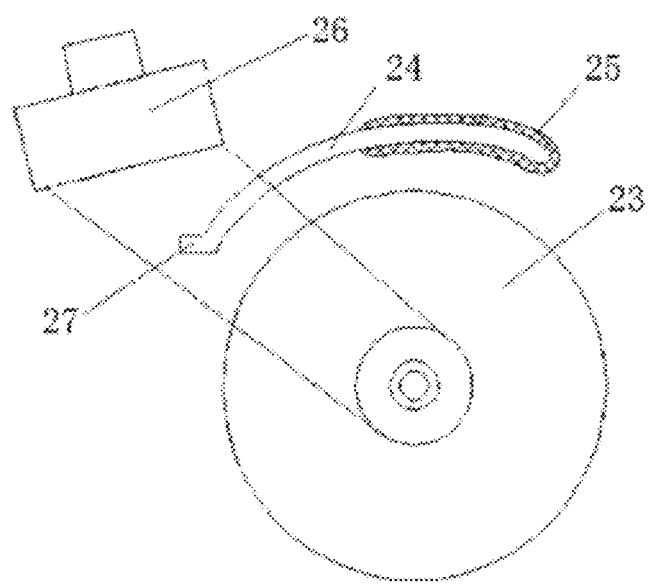
FIG. 13 is a schematic diagram illustrating the matching between a brake and a wheel of Embodiment 1 of the present invention.

As shown in FIG. 13, a brake 24 is provided above a rear one of wheels 23 of the leisure sports scooter in this embodiment, and the brake 24 is wrapped with a brake sleeve 25. The brake 24 is fixed on a rear wheel carrier 26 by a brake connecting portion 27.

The handlebar of the present invention can move up and down relatively to the rotating shaft, and a matched positioning mechanism is provided between the handlebar and the connecting base; the positioning mechanism is disabled by pulling the handlebar; and the operations of folding and unfolding can be completed by pulling and rotating the handlebar, which is very convenient. Since the safety mechanism for preventing the handlebar from moving when the handlebar is positioned, it is safer and more reliable to use the folding mechanism of the present invention. Since no connecting base formed by two mutually matched casings is required to be customized for the scooter of the present invention, the present invention has a simpler structure and reduced manufacturing cost. The leisure sports scooter of the present invention encompasses unpowered leisure sports scooters such as scooters, frog kick scooters, tri scooters and swing scooters.

Figure 7:
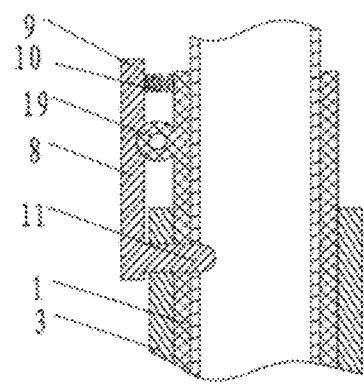
FIG. 7 is a structural view of a second safety catch according to Embodiment 1 of the present invention.

FIG. 7 is a structural view of a second safety catch according to the present invention. The safety catch 8 is arranged outside the hinging segment 1, the safety catch 8 is provided with a button 9 and a positioning bump 11 which are integrated with the safety catch 8, the button 9 is located outside the hinging segment 1, and the handlebar 21 and the hinging segment 1 are connected by the positioning bump 11; a rotating fulcrum 19 is provided in the middle segment of the safety catch 8, and the button and the positioning bump are respectively located on two sides of the rotating fulcrum 19; on one side of the safety catch 8, a safety spring 10 is provided, with one end of the safety spring 10 resisted against the button 9 of the safety catch while the other end resisted against the hinging segment 1; and, by pressing the button 9, the positioning bump is driven to relieve the connection between the connecting base 3 and the hinging segment 1.

Figure 8:
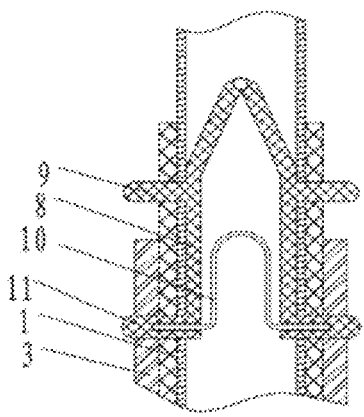
FIG. 8 is a structural view of a third safety catch according to Embodiment 1 of the present invention.

FIG. 8 is a structural view of a third safety catch according to the present invention. The safety catch 8 is provided within the handlebar 21, and the safety catch 8 is provided with a button 9 and a positioning bump 11 which are integrated with the safety catch 8; the safety catch 8 has two groups of buttons 9 and positioning bumps 11, the two groups of buttons 9 are in a same radial direction, the two groups of positioning bump 11 are also in a same radial direction, and the positioning bumps 11 are beneath the buttons 9; the button 9 is passed through the handlebar 21 and the hinging segment 1, with one end of the button 9 exposed outside the hinging segment 1; the hinging segment 1 and the connecting base 3 are connected by the positioning bump 11; a Ω-shaped safety spring 10 is provided within the handlebar, and two ends of the safety spring 10 are respectively fixed on two positioning bumps.

Figure 9:
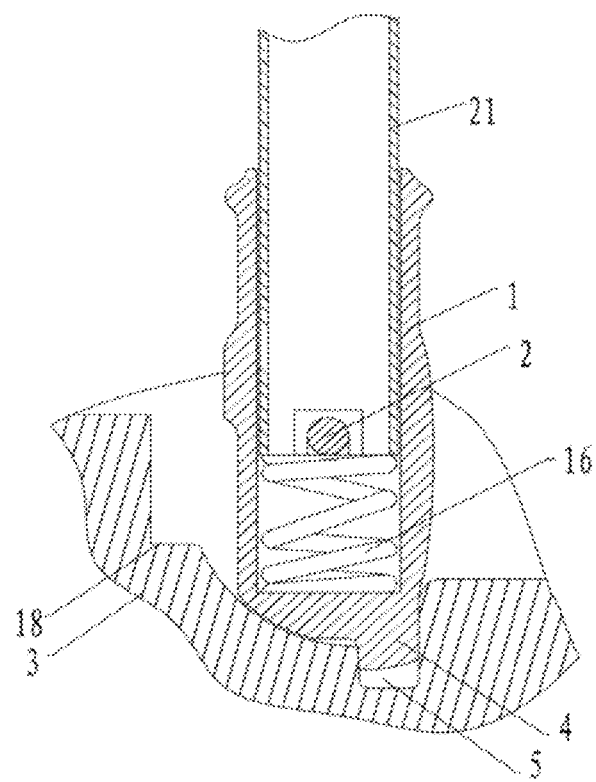
FIG. 9 is a structural view of a second reset mechanism according to Embodiment 1 of the present invention.

FIG. 9 is a structural view of a second reset mechanism according to the present invention. The reset spring 16 is a pressure spring; an open slot capable of receiving the rotating shaft is beneath the handlebar 21; one end of the hinging segment is open while the other end of the hinging segment is closed, and the open end of the hinging segment is connected with the handlebar, one end of the reset spring is resisted against an inner cavity of the hinging segment, and the other end of the reset spring is resisted against the lower end of the handlebar.

Figure 10:
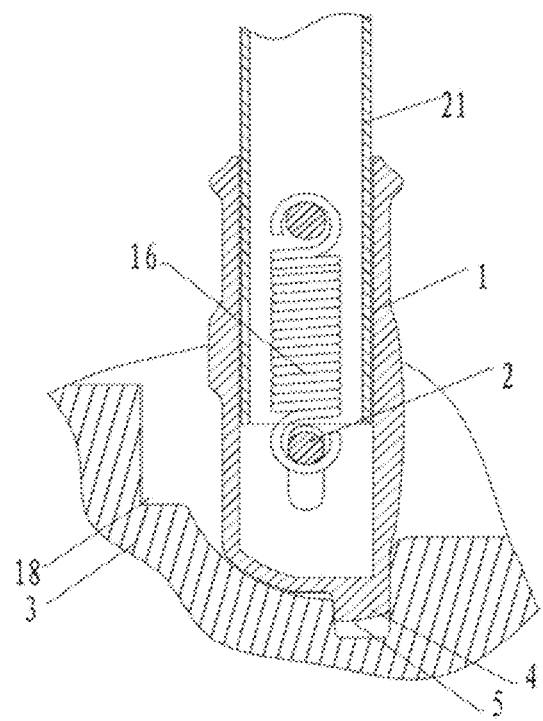
FIG. 10 is a structural view of a third reset mechanism according to Embodiment 1 of the present invention.

FIG. 10 is a structural view of a third reset mechanism according to the present invention. The reset spring 16 is a tension spring; a pin shaft 20 is provided at the inner wall of the handlebar 21; and one end of the reset spring is connected with the rotating shaft 2, and the other end of the reset spring is connected with the pin shaft 20.

The leisure scooter of the present invention may use a combination of safety mechanisms or reset mechanisms having any one of structures described above.

Figure 11:
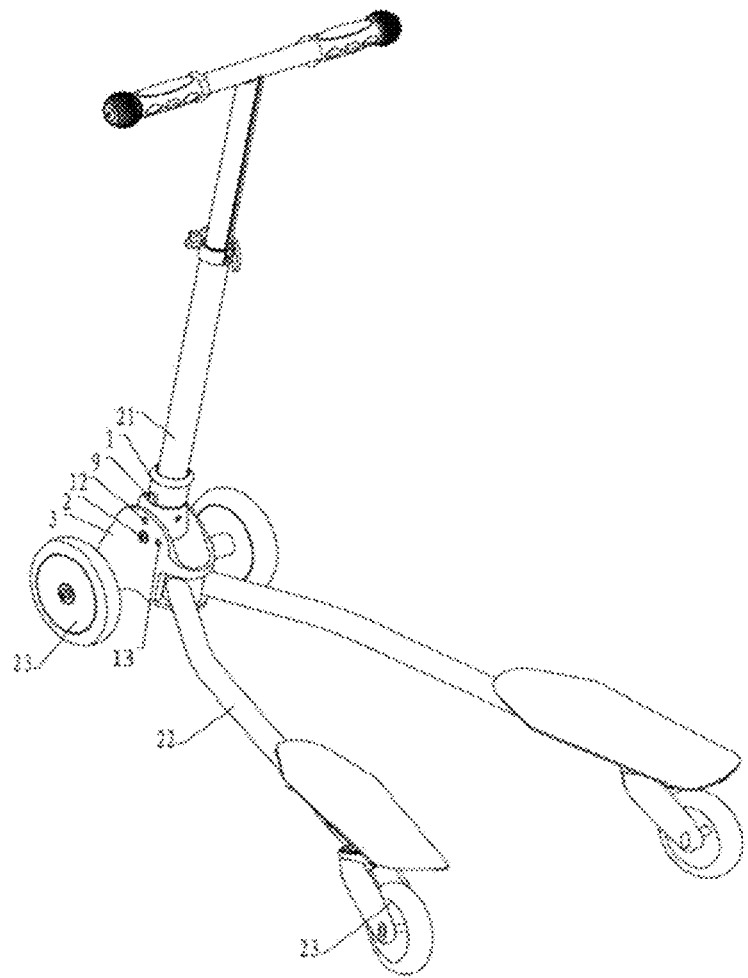
FIG. 11 is a schematic diagram of a handlebar of a leisure sports scooter according to Embodiment 2 of the present invention, when unfolded.
Figure 12:
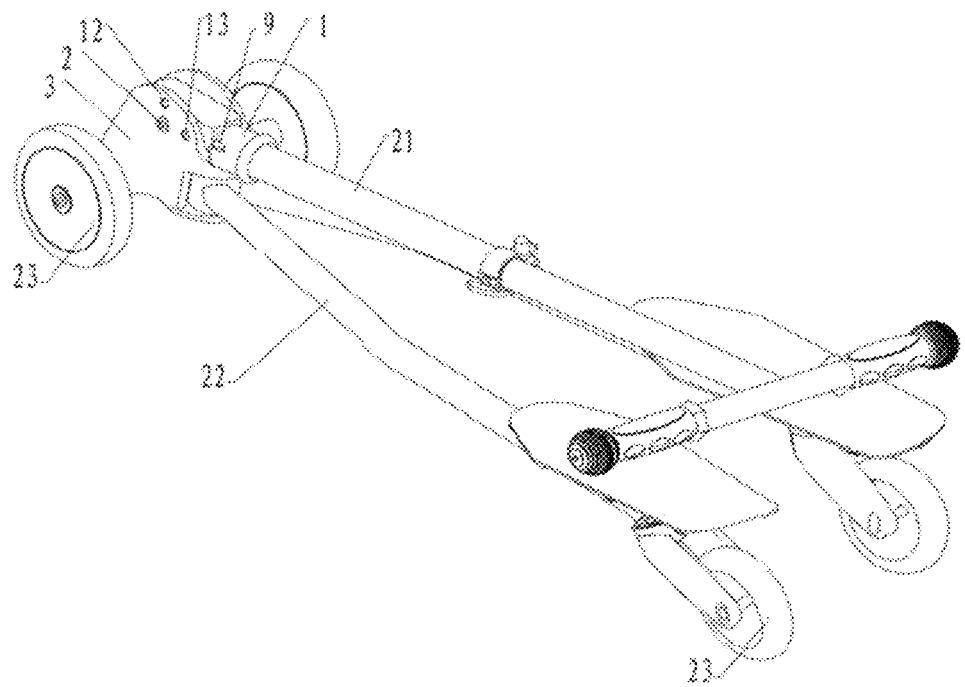
FIG. 12 is a schematic diagram of folding a handlebar of a leisure sports scooter according to Embodiment 2 of the present invention, when folded.

FIG. 11 and FIG. 12 show another leisure sports scooter of the present invention. The leisure sports scooter of this embodiment is a tri scooter. The purpose of the present invention can also be realized by using the folding mechanism of the present invention.

The foregoing descriptions are merely specific implementations of the present invention, and any variations or replacements made without departing from the principle of the present invention shall be regarded as falling into the protection scope of the present invention.

The invention claimed is:

1. A leisure sports scooter, comprising a scooter body, wheels and a handlebar, a folding mechanism being provided between the handlebar and the scooter body, the folding mechanism comprising a hinging segment provided at a lower end of the handlebar and connected with a connecting base through a rotating shaft, wherein the hinging segment is a handlebar joint fixed at a lower handlebar segment of the handlebar or the hinging segment is a lower handlebar segment of the handlebar integrated with the handlebar; the rotating shaft is positioned on the connecting base, the handlebar can move up and down relatively to the rotating shaft, and a matched positioning mechanism is provided between the handlebar and the connecting base; when the handlebar moves to a first position, the handlebar and the connecting base are positioned, and the positioning mechanism prevents the handlebar from rotating; when the handlebar moves to a second position, the positioning mechanism is disabled, and when the handlebar is rotated, the handlebar can rotate around the rotating shaft to be folded or unfolded; and the folding mechanism is equipped with a safety mechanism preventing the handlebar from moving upon positioning of the handlebar, wherein the safety mechanism comprises a safety catch provided within the handlebar, and the safety catch is provided with a button and a positioning bump; the button is passed through the handlebar and the hinging segment, with one end of the button exposed outside the hinging segment; the handlebar and the hinging segment are connected by the positioning bump; on one side of the safety catch, a safety spring is provided, with one end of the safety spring resisted against the safety catch while the end resisted against the handlebar; and, by pressing the button, the positioning bump is driven to relieve a connection between the connecting base and the hinging segment.

2. The leisure sports scooter according to claim 1, wherein an upright positioning hole and a folding positioning hole are formed on the connecting base, and the positioning bump can get into or out of the upright positioning hole and the folding positioning hole.

3. The leisure sports scooter according to claim 1, wherein the safety catch and the button thereon are integrated with the positioning bump.

4. The leisure sports scooter according to claim 1, further comprises a reset mechanism comprising a reset spring; the reset spring is located between the rotating shaft and the hinging segment, when the handlebar is pulled upward, the handlebar moves upward relatively to the connecting base so that the handlebar moves to the second position, when the handlebar is rotated, the handlebar can rotate around the rotating shaft to be folded or unfolded: and the handlebar is released, the reset spring drives the handlebar to move downward relatively to the connecting base, and when the handlebar moves to the first position, the handlebar and the connecting base are positioned, wherein the reset spring is a pressure spring; one end of the hinging segment is open while the other end thereof is closed, and the open end of the hinging segment is connected with the handlebar; a spring seat is provided between the handlebar and the hinging segment, and the spring seat is sleeved on the rotating shaft; one end of the reset spring is resisted against an inner wall of the closed end of the hinging segment, and the other end of the reset spring is resisted against the spring seat.

5. The leisure sports scooter according to claim 1, wherein the leisure sports scooter further comprises a reset mechanism comprising a reset spring: the reset spring is located between the rotating shaft and the hinging segment when the handlebar is pulled upward the handlebar moves upward relatively to the connecting base so that the handlebar moves to the second position, when the handlebar is rotated, the handlebar can rotate around the rotating shaft to be folded or unfolded and the handlebar is released the reset spring drives the handlebar to move downward relatively to the connecting base, and when the handlebar moves to the first position, the handlebar and the connecting base are positioned, wherein the reset spring is a pressure spring; an open slot capable of receiving the rotating shaft is formed beneath the handlebar; one end of the hinging segment is open while the other end of the hinging segment is closed, and the open end of the hinging segment is connected with the handlebar, one end of the reset spring is resisted against an inner cavity of the hinging segment, and the other end of the reset spring is resisted against the lower end of the handlebar.

6. The leisure sports scooter according to claim 1, wherein the handlebar is arranged at a front end of the scooter body, a brake is provided at a rear end of the scooter body, and the brake is located above a rear wheel and wrapped with a brake sleeve.

7. A leisure sports scooter, comprising a scooter body, wheels and a handlebar, a folding mechanism being provided between the handlebar and the scooter body, the folding mechanism comprising a hinging segment provided at a lower end of the handlebar and connected with a connecting base through a rotating shaft, wherein the hinging segment is a handlebar joint fixed at a lower handlebar segment of the handlebar or the hinging segment is a lower handlebar segment of the handlebar integrated with the handlebar; the rotating shaft is positioned on the connecting base, the handlebar can move up and down relatively to the rotating shaft, and a matched positioning mechanism is provided between the handlebar and the connecting base; when the handlebar moves to a first position, the handlebar and the connecting base are positioned, and the positioning mechanism prevents the handlebar from rotating: when the handlebar moves to a second position, the positioning mechanism is disabled, and when the handlebar is rotated, the handlebar can rotate around the rotating shaft to be folded or unfolded; and the folding mechanism is equipped with a safety mechanism preventing the handlebar from moving upon positioning of the handlebar, wherein the safety mechanism comprises: a safety catch arranged outside the hinging segment; the safety catch is provided with a button and a positioning bump which are integrated with the safety catch, the button is located outside the hinging segment, and the handlebar and the hinging segment are connected by the positioning bump; a rotating fulcrum is provided in the middle segment of the safety catch, and the button and the positioning bump are respectively located on two sides of the rotating fulcrum; on one side of the safety catch, a safety spring is provided, with one end of the safety spring resisted against the button of the safety catch while the other end resisted against the hinging segment; and, by pressing the button, the positioning bump is driven to relieve a connection between the connecting base and the hinging segment.

8. A leisure sports scooter, comprising a scooter body, wheels and a handlebar, a folding mechanism being provided between the handlebar and the scooter body, the folding, mechanism comprising a hinging segment provided at a lower end of the handlebar and connected with a connecting base through a rotating shaft, wherein the hinging segment is a handlebar joint fixed at a lower handlebar segment of the handlebar or the hinging segment is a lower handlebar segment of the handlebar integrated with the handlebar: the rotating shaft is positioned on the connecting base, the handlebar can move up and down relatively to the rotating shaft, and a matched positioning mechanism is provided between the handlebar and the connecting base; when the handlebar moves to a first position, the handlebar and the connecting base are positioned, and the positioning mechanism prevents the handlebar from rotating; when the handlebar moves to a second position, the positioning mechanism is disabled, and when the handlebar is rotated, the handlebar can rotate around the rotating shaft to be folded or unfolded; and the folding mechanism is equipped with a safety mechanism preventing the handlebar from moving upon positioning of the handlebar, wherein the safety mechanism comprises a safety catch provided within the handlebar, and the safety catch has two groups of buttons and positioning bumps which are integrated with the safety catch, the two groups of buttons are in corresponding positions in the same direction which is facing one end of the handlebar, the two groups of positioning bump are also in corresponding positions in the same direction which is facing one end of the handlebar, and the positioning bumps are beneath the buttons; the button is passed through the handlebar and the hinging segment, with one end of the button exposed outside the hinging segment; the hinging segment and the connecting base are connected by the positioning bump; a Ω-shaped safety spring is provided within the handlebar, and two ends of the spring are respectively fixed on the two positioning bumps.

* * * * *